UNITED STATES PATENT OFFICE.

MAX WEILER, OF ELBERFELD, GERMANY, ASSIGNOR TO SYNTHETIC PATENTS CO., INC., OF NEW YORK, N. Y., A CORPORATION OF NEW YORK.

YELLOWISH-GREEN TRIPHENYLMETHANE DYE.

1,101,770.  Specification of Letters Patent.  Patented June 30, 1914.

No Drawing.  Application filed July 17, 1913.  Serial No. 779,632.

*To all whom it may concern:*

Be it known that I, MAX WEILER, doctor of philosophy, chemist, citizen of the German Empire, residing at Elberfeld, Germany, have invented new and useful Improvements in Yellowish-Green Triphenylmethane Dye, of which the following is a specification.

I have found that new and valuable coloring matters of the triphenylmethane series can be obtained by condensing sulfonic acids of alkylized or aralkylized meta-toluidins or mixtures thereof with aromatic aldehydes containing no alkylamino group in para position to the carbonyl group and oxidizing the resulting leuco compounds or condensing the said amins with the aldehydes, sulfonating and oxidizing the leuco compounds. These coloring matters have a constitution graphically represented as follows:

where R and R′ are the radicals or residues of meta-toluidins substituted in the amino group, *e. g.*, by alkyl or aralkyl radicals, and R² an aromatic radical or residue which may or may not be substituted by alkyl, sulfonic or other groups, halogen, etc.

The new dyes are after being dried and pulverized in the shape of their alkaline salts dark powders soluble in water generally with a yellowish-green coloration. They are distinguished from the known coloring matters of this series by furnishing green shades on wool of a yellow tint which could hitherto only be obtained with mixture of green triphenylmethane dyes with other yellow coloring matters. The shades thus obtained possess a good fastness to alkali and fulling.

In order to illustrate the new process more fully the following example is given, the parts being by weight:—245 parts of ethylbenzyl-meta-toluidin-sulfonic acid (sodium salt) are boiled during 70 hours together with 920 parts of water, 111.6 parts of sulfuric acid (60° Bé.), 100 parts of alcohol and 71 parts of ortho-chlorobenzaldehyde. The leuco acid separates as a solid, it is filtered off, dissolved in sodium carbonate solution and oxidized with $PbO_2$ and sulfuric acid. The new coloring matter having in a free state most probably the formula:

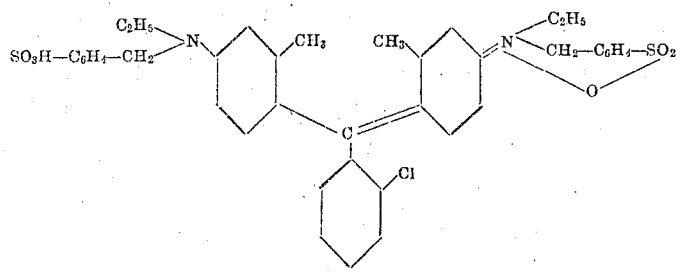

is a dark green powder soluble in water with a yellowish-green coloration and dyeing wool yellowish-green shades fast to alkali and to fulling. Other components can be used, *e. g.* benzaldehyde, meta- or para-chlorobenzaldehyde, para-tolylaldehyde, 2.4-dimethylbenzaldehyde, ortho-sulfobenzaldehyde, 2-chloro-5-sulfobenzaldehyde, meta-oxybenzaldehyde or on the other hand diethyl-meta-toluidin, etc.

I claim:—

1. The new dyes of the triphenylmethane series being sulfonic acids derived from an aromatic aldehyde and a meta-toluidin substituted in the amino group having the following graphically represented constitution:

where R and R′ are the radicals of metatoluidins substituted in the amino group, and R² an aromatic radical, which dyes are after being dried and pulverized in the shape of their alkaline salts dark powders soluble in water generally with a yellowish-green coloration; dyeing wool green shades distinguished by their yellowish tint fast to alkali and to fulling, substantially as described.

2. The new dyes of the triphenylmethane series being sulfonic acids derived from a halogen substituted aromatic aldehyde and a meta-toluidin substituted in the amino group, having the following graphically represented constitution:

where R and R' are the radicals of metatoluidins substituted in the amino group, and R² a halogen substituted aromatic radical, which dyes are after being dried and pulverized in the shape of their alkaline salts dark powders soluble in water generally with a yellowish-green coloration; dyeing wool green shades distinguished by their yellowish tint fast to alkali and to fulling, substantially as described.

3. The new dyes of the triphenylmethane series being sulfonic acids derived from an aromatic aldehyde and a meta-toluidin substituted in the amino group having the following graphically represented constitution:

where R and R' are the radicals of metatoluidins substituted in the amino group and R² a substituted aromatic radical, which dyes are after being dried and pulverized in the shape of their alkaline salts dark powders soluble in water generally with a yellowish-green coloration; dyeing wool green shades distinguished by their yellowish tint fast to alkali and to fulling, substantially as described.

4. The new dyes of the triphenylmethane series derived from a chlor-substituted aromatic aldehyde and a meta-toluidin substituted in the amino group having the following graphically represented constitution:

where R and R' are the radicals of metatoluidins substituted in the amino group, and R² a chlor-substituted aromatic radical which dyes are after being dried and pulverized in the shape of their alkaline salts dark powders soluble in water generally with a yellowish-green coloration; dyeing wool green shades distinguished by their yellowish tint fast to alkali and to fulling, substantially as described.

5. The new dyes having in a free state the formula graphically represented

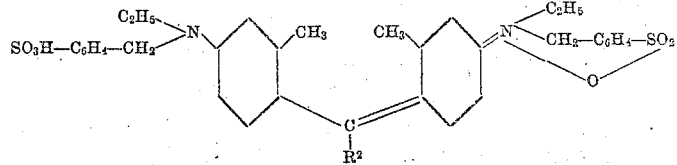

where R² is a substituted aromatic radical which are after being dried and pulverized green powders soluble in water with a yellowish-green coloration and dyeing wool yellowish-green shades fast to alkali and to fulling, substantially as described.

6. The new dye having in a free state most probably the formula:

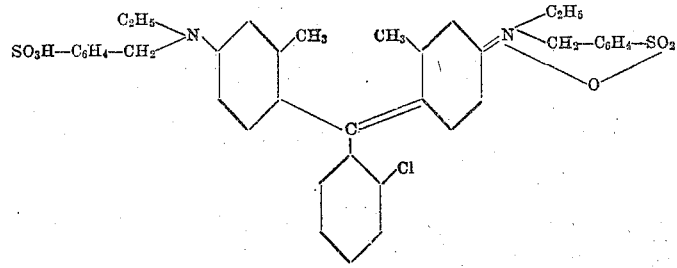

which is after being dried and pulverized a green powder soluble in water with a yellowish-green coloration and dyeing wool yellowish-green shades fast to alkali and to fulling, substantially as described.

In testimony whereof I have hereunto set my hand in the presence of two subscribing witnesses.

MAX WEILER. [L. S.]

Witnesses.
ALBERT NUFER,
H. SIMONS.